US008495574B2

(12) United States Patent
Harding et al.

(10) Patent No.: US 8,495,574 B2
(45) Date of Patent: Jul. 23, 2013

(54) CODE COVERAGE TOOL

(75) Inventors: Matthew John Harding, Austin, TX (US); Mitchell Perry Harding, Round Rock, TX (US); Joshua Delcambre Miers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 12/139,611

(22) Filed: Jun. 16, 2008

(65) Prior Publication Data

US 2009/0313607 A1 Dec. 17, 2009

(51) Int. Cl.
*G06F 9/44* (2006.01)

(52) U.S. Cl.
USPC ............ 717/124; 717/125; 717/126; 717/127

(58) Field of Classification Search
USPC .................. 717/124, 125, 126, 127
See application file for complete search history.

(56) References Cited

U.S. PATENT DOCUMENTS

| | | | |
|---|---|---|---|
| 5,530,942 A | 6/1996 | Tzou | |
| 5,754,760 A | 5/1998 | Warfield | |
| 5,778,169 A * | 7/1998 | Reinhardt | 714/38.1 |
| 6,049,666 A | 4/2000 | Bennett | |
| 6,069,873 A * | 5/2000 | Pugaczewski et al. | 370/241 |
| 6,212,675 B1 * | 4/2001 | Johnston et al. | 717/107 |
| 6,275,223 B1 | 8/2001 | Hughes | |
| 6,311,324 B1 | 10/2001 | Smith | |
| 6,779,135 B1 | 8/2004 | Ur | |
| 7,203,882 B2 | 4/2007 | Fine | |
| 7,272,752 B2 | 9/2007 | Farchi | |
| 2002/0019969 A1 * | 2/2002 | Hellestrand et al. | 716/5 |
| 2003/0121011 A1 | 6/2003 | Carter | |
| 2004/0064544 A1 * | 4/2004 | Barsness et al. | 709/224 |
| 2008/0270845 A1 * | 10/2008 | Petersen et al. | 714/45 |

OTHER PUBLICATIONS

Lingampally, et al. "A Multipurpose Code Coverage Tool for Java", 2007, IEEE, p. 1-10.*
Code Coverage Tools—downloaded from www.codecoveragetools.com on May 5, 2008.
Haghighat—The Future of Code Coverage Tools—downloaded from www.stickyminds.com on May 5, 2008.
Couper—Code Coverage Management—IBM TDB (ip.com) (Jan. 1, 1991).
IBM TDB—Java Test Coverage Tool Analyser—IBM TDB (ip.com) (Jun. 30, 2003).

* cited by examiner

*Primary Examiner* — Qamrun Nahar
(74) *Attorney, Agent, or Firm* — Stephen J. Walder, Jr.; Diana R. Gerhardt

(57) ABSTRACT

A code coverage tool tests a program under test that executes on a processor of an information handling system (IHS). The code coverage tool may apportion the program under test into code portions of interest that exhibit a user-specified granularity level. A user may request that the code coverage tool change the granularity level of the code portions of interest in real time. The code coverage tool conducts testing of the code portions of interest according to test criteria that the user may specify in real time. The code coverage tool may provide test results for each of the code portions of interest in real time. The code coverage tool may also provide a summary report after providing real time results for the code portions of interest. The user may specify that the code coverage tool generate real time test results in the form of sensory output, for example auditory output or visual output, for each of the code portions of interest. The code coverage tool may alter the type of sensory output in real time at the request of the user.

14 Claims, 10 Drawing Sheets

FIG. 3D

USER INPUT PANEL — 350

CODE PORTION OF INTEREST:
(ONE OF PORTIONS 301, 302, ...N)

SELECT TEST CRITERIA:

HITS/SECOND = __50__ — 355

SELECT OUTPUT TYPE:

- (●) AUDITORY — 360
  - (●) GENERATE AUDIO FREQUENCY, F1, IF CRITERIA MET — 361
    - F1 = _____ HERTZ — 362
  - (●) INCREASE AUDIO FREQUENCY OR BEEP RATE AS NUMBER OF HITS INCREASES — 363
  - (●) DECREASE AUDIO FREQUENCY OR BEEP RATE AS NUMBER OF HITS INCREASES — 364
  - (○) INCREASE AUDIO VOLUME AS NUMBER OF HITS INCREASES — 365
  - (○) DECREASE AUDIO VOLUME AS NUMBER OF HITS INCREASES — 366

- (●) VISUAL — 370

SELECT COLOR OF CODE PORTION NOT MEETING TEST CRITERIA

| GREEN | RED | BLUE | YELLOW |
  |---|---|---|---|
  | (●) 371 | (●) 372 | (●) 373 | (●) 374 |

SELECT COLOR OF CODE PORTION MEETING TEST CRITERIA

| GREEN | RED | BLUE | YELLOW |
  |---|---|---|---|
  | (●) 375 | (●) 376 | (●) 377 | (●) 378 |

SELECT PATTERN OF CODE PORTION NOT MEETING TEST CRITERIA (●) 381   (●) 382   (●) 383   (●) 384

SELECT PATTERN OF CODE PORTION MEETING TEST CRITERIA (●) 385   (●) 386   (●) 387   (●) 388

FIG. 3F

USER INPUT PANEL — 350

CODE PORTION OF INTEREST:
(ONE OF PORTIONS 301, 302, ...N)

SELECT TEST CRITERIA:

HITS/SECOND = __40__ — 355

SELECT OUTPUT TYPE:

- (●) AUDITORY — 360
  - (●) GENERATE AUDIO FREQUENCY, F1, IF CRITERIA MET — 361
    - F1 = _____ HERTZ — 362
  - (●) INCREASE AUDIO FREQUENCY OR BEEP RATE AS NUMBER OF HITS INCREASES — 363
  - (●) DECREASE AUDIO FREQUENCY OR BEEP RATE AS NUMBER OF HITS INCREASES — 364
  - ( ) INCREASE AUDIO VOLUME AS NUMBER OF HITS INCREASES — 365
  - ( ) DECREASE AUDIO VOLUME AS NUMBER OF HITS INCREASES — 366
- (●) VISUAL — 370

SELECT COLOR OF CODE PORTION NOT MEETING TEST CRITERIA

| GREEN | RED | BLUE | YELLOW |
|---|---|---|---|
| ( ) 371 | (●) 372 | ( ) 373 | ( ) 374 |

SELECT COLOR OF CODE PORTION MEETING TEST CRITERIA

| GREEN | RED | BLUE | YELLOW |
|---|---|---|---|
| (●) 375 | ( ) 376 | ( ) 377 | ( ) 378 |

SELECT PATTERN OF CODE PORTION NOT MEETING TEST CRITERIA ( ) 381   (●) 382   ( ) 383   ( ) 384

SELECT PATTERN OF CODE PORTION MEETING TEST CRITERIA ( ) 385   (●) 386   ( ) 387   ( ) 388

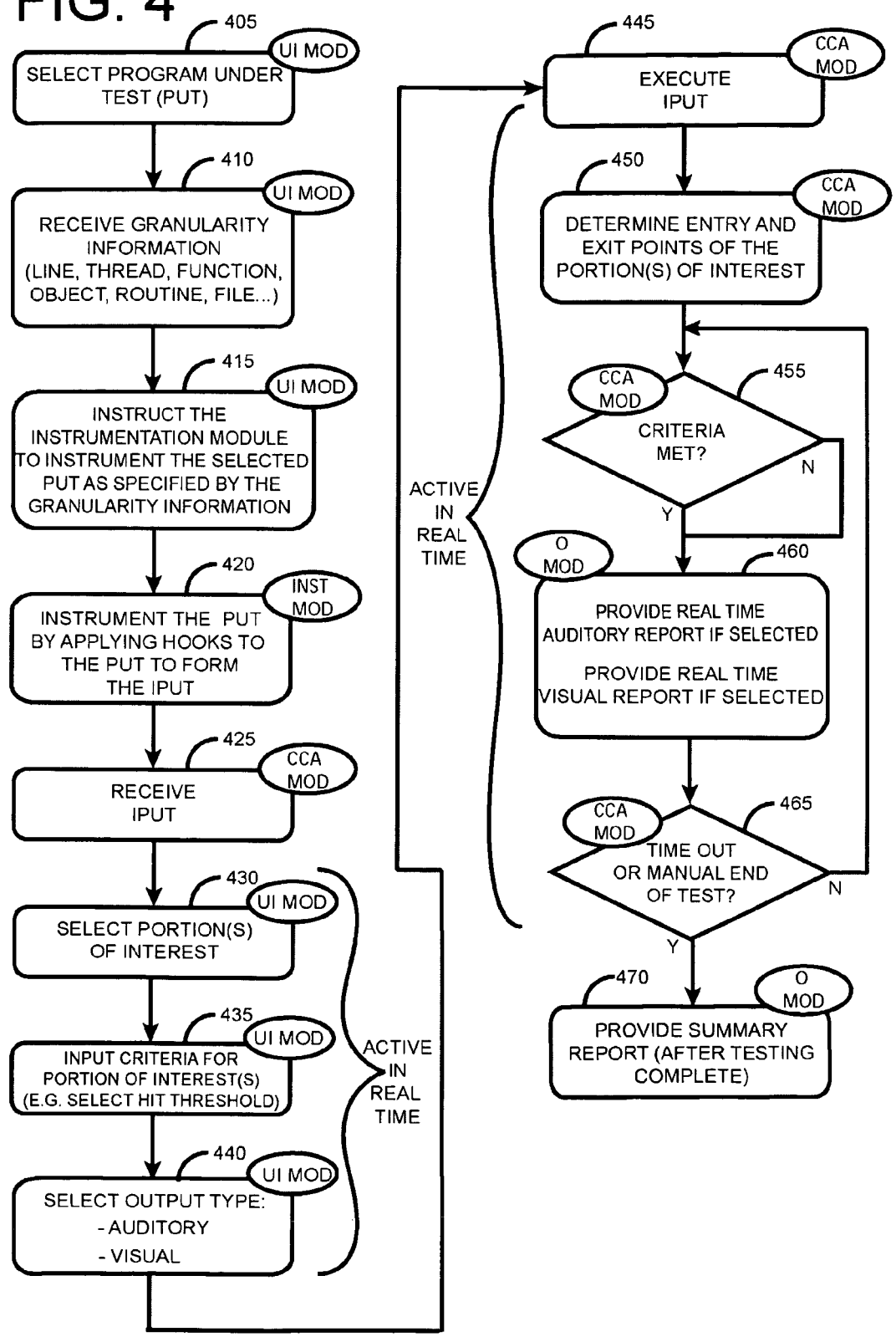

CODE COVERAGE TOOL

BACKGROUND

The disclosures herein relate generally to information handling systems (IHSs), and more specifically, to the testing of software that information handling systems execute.

Information handling systems (IHSs) execute software written by programmers. Typically, the programmer writes programs at the source code level. A compiler may then compile the source code to provide object code that the IHS executes. Source code and object code may include multiple modules, subroutines, objects, threads, functions and other structures depending on the type of code. Code coverage tools seek to systematically test or exercise these subroutines, objects, threads, functions and other structures.

BRIEF SUMMARY

In one embodiment, a method of testing a program under test is provided. The method comprises receiving, by a code coverage tool, first test coverage information that describes a first test to be conducted on a program under test. The method further comprises receiving, by the code coverage tool, first user input specifying a granularity level and inserting, by the code coverage tool, hooks in the program under test according to the granularity level to form an instrumented program under test. The method also comprises testing, by the code coverage tool, the instrumented program under test based on the first test coverage information to produce test results. The method further comprises presenting the test results as sensory output, by the code coverage tool, in real time based on the test output configuration information.

In other embodiments, an information handling system (IHS) and computer program product are provided. The IHS comprises a processor and a memory coupled to the processor. The memory is configured with a code coverage tool that performs various ones of, and combinations of, the operations outlined above with regard to the method illustrative embodiment. The computer program product comprises a computer useable or readable medium having a computer readable program, which when executed on a computing device, causes the computing device to perform various ones of, and combinations of, the operations outlined above with regard to the method illustrative embodiment.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3B-3F show a representative user input panel with different selections that a user may employ to provide test coverage information to the test coverage tool.

FIG. 4 is a flowchart that depicts representative process flow as the IHS carries out the disclosed methodology.

DETAILED DESCRIPTION

Figure 1:
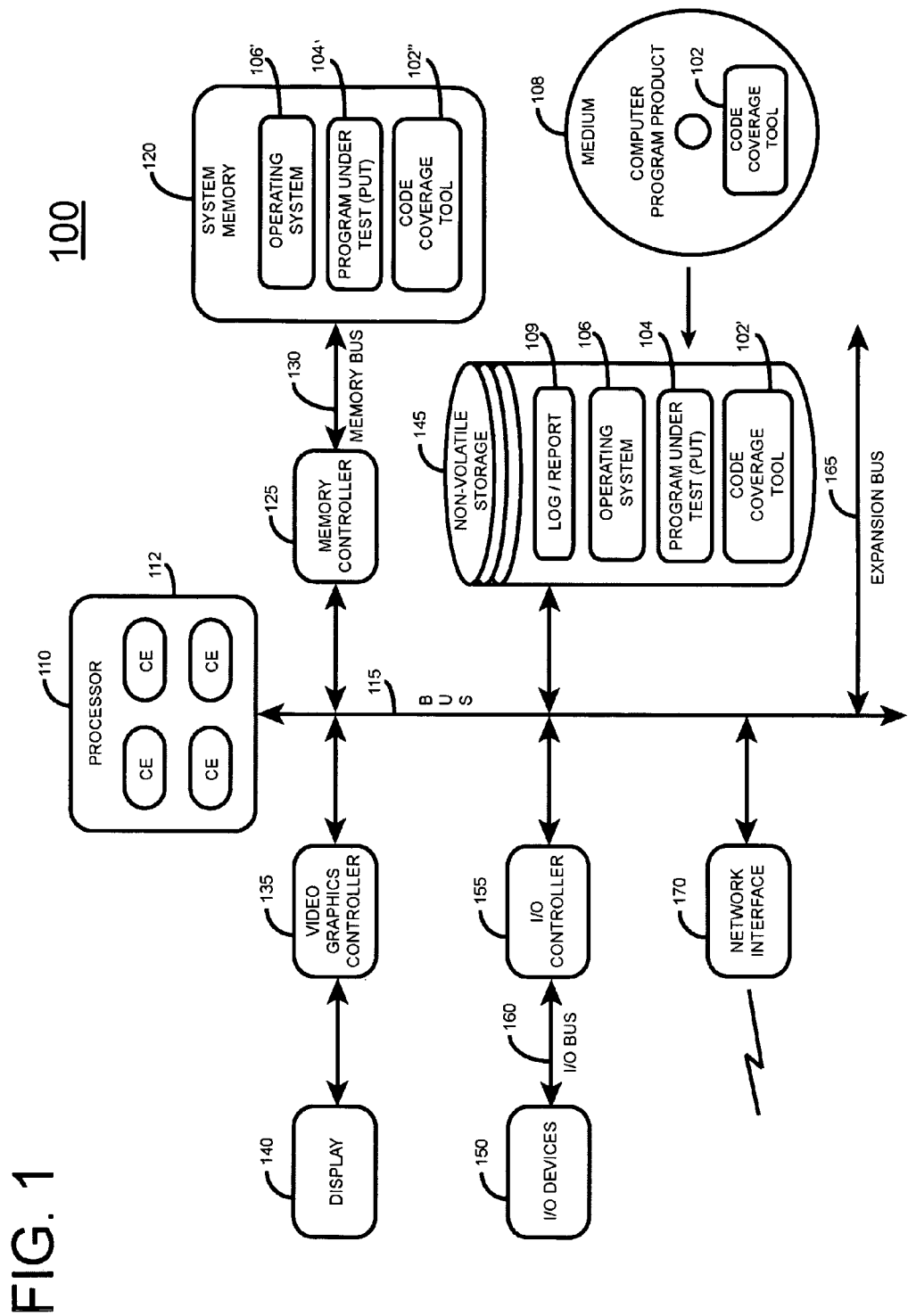
FIG. 1 shows a block diagram of one embodiment of the disclosed information handling system (IHS).

FIG. 1 shows an information handling system (IHS) 100 that includes a code coverage tool 102, a program under test (PUT) 104 and an operating system 106. IHS 100 may initially store code coverage tool 102 as a computer program product on a medium 108, such as a CD, DVD or other medium. In this particular embodiment, IHS 100 includes a processor 110 having multiple compute elements (CEs) on a common semiconductor die 112. IHS 100 processes, transfers, communicates, modifies, stores or otherwise handles information in digital form, analog form or other form. IHS 100 includes a bus 115 that couples processor 110 to system memory 120 via a memory controller 125 and memory bus 130. A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. Operating system 106 loads in memory 120 to govern the operation of IHS 100. I/O devices 150, such as a keyboard and a mouse pointing device, couple to bus 115 via I/O controller 155 and I/O bus 160. One or more expansion busses 165, such as USB, IEEE 1394 bus, ATA, SATA, PCI, PCIE and other busses, couple to bus 115 to facilitate the connection of peripherals and devices to IHS 100. A network interface adapter 170 couples to bus 115 to enable IHS 100 to connect by wire or wirelessly to a network and other information handling systems. While FIG. 1 shows one IHS that employs processor 110, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

A user of IHS 100 loads medium 108 into IHS 100 to store code coverage tool 102 on non-volatile storage 145 as code coverage tool 102'. Nonvolatile storage 145 also stores program under test (PUT) 104. When IHS 100 initializes, the IHS loads operating system 106 into system memory 120 for execution as operating system 106'. The IHS also loads code coverage tool 102' into system memory 120 for execution as code coverage tool 102". IHS 100 further loads program under test (PUT) 104 into system memory 120 for execution as PUT 104'. Code coverage tool 102" conducts tests on PUT 104' to exercise the software code of PUT 104' as discussed in more detail below.

Figure 2:
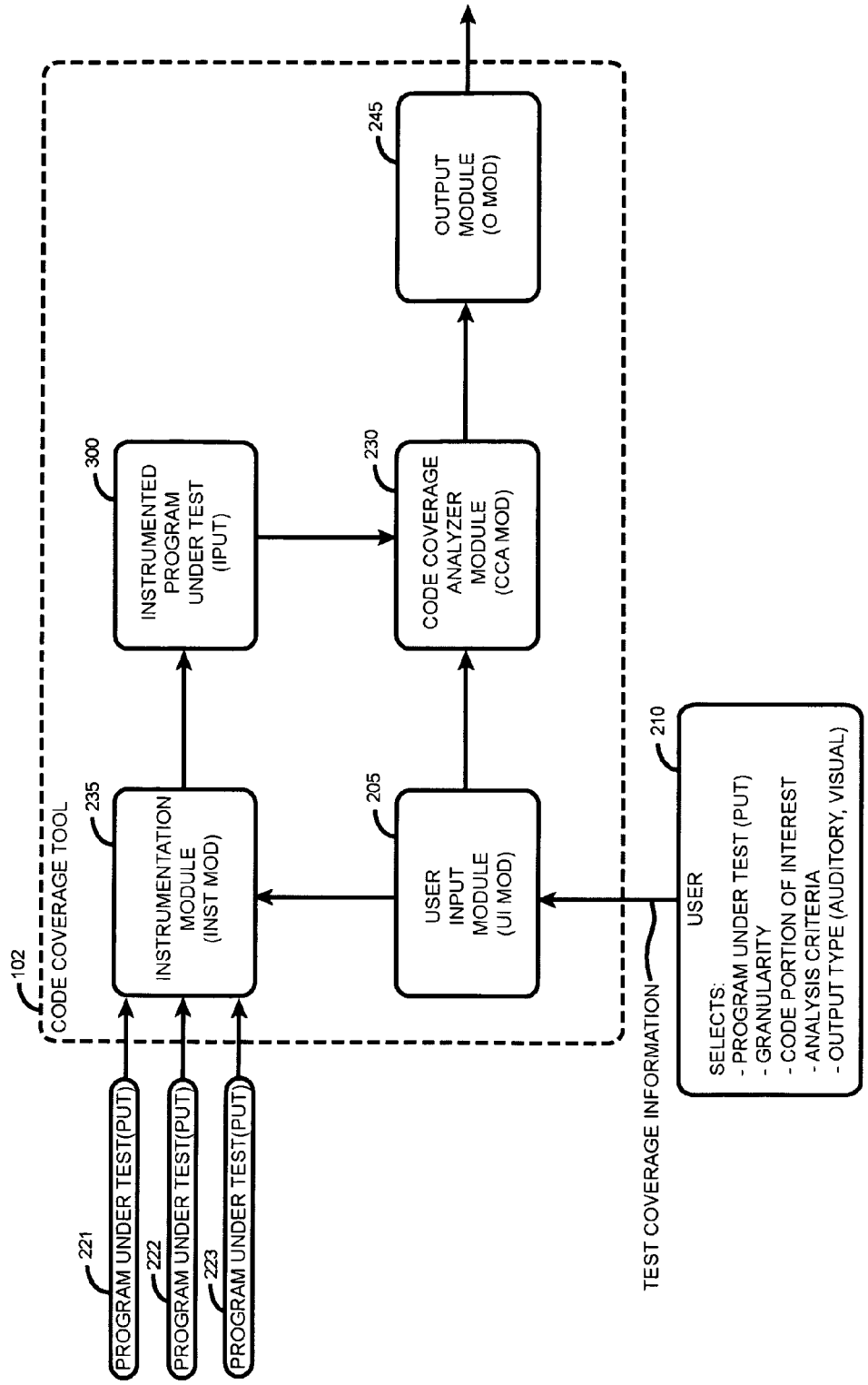
FIG. 2 shows a representation of the code coverage tool of the disclosed IHS.

FIG. 2 is a block diagram that illustrates representative aspects of code coverage tool 102. Code coverage tool 102 includes a user input module 205 that receives test coverage information from a user 210. The user 210 sends test coverage information to user input module 205 to select a program under test (PUT) for testing. The test coverage information designates a particular program under test (PUT), such as PUT 221, 222 and 223, on which a code coverage module 230 will conduct testing. In this example, the user 210 selects PUT 221 for testing. User input module 205 communicates this test coverage information to an instrumentation module (INST MOD) 230.

In response to the test coverage information that instrumentation module 235 receives, instrumentation module 235 instruments the selected PUT, such as PUT 221, for example. The test coverage information that the user provides includes granularity information. The granularity information specifies the granularity or amount of detail that the user 210 desires the code coverage analyzer module 230 apply to the selected PUT 221. For example, if the user desires analysis of PUT 221 at the line of code (LOC) granularity level, then user 210 so indicates in the test coverage information. In one embodiment, the LOC granularity level is the highest level of granularity selectable by the user 210. Alternatively, user 210 may select other levels of granularity, such as thread, function, object, routine and module levels, for example. In response to receiving the granularity information or test coverage information, instrumentation module 235 instruments PUT 221 at the level that the granularity information indicates. For example, if the granularity information indicates the line of code (LOC) level, then instrumentation module 235 inserts a hook after each line of code (LOC) of the selected PUT 221. If the granularity information indicates the thread level, then instrumentation module 235 inserts a hook after each thread of PUT 221. If the granularity information indicates the function level, then instrumentation module 235 inserts a hook after each function of PUT 221, and so forth for other granularity levels. In this manner, instrumentation module 235 generates instrumented program under test (IPUT) 300 with hooks at the selected level of granularity that the test coverage information indicates.

Figure 3A:
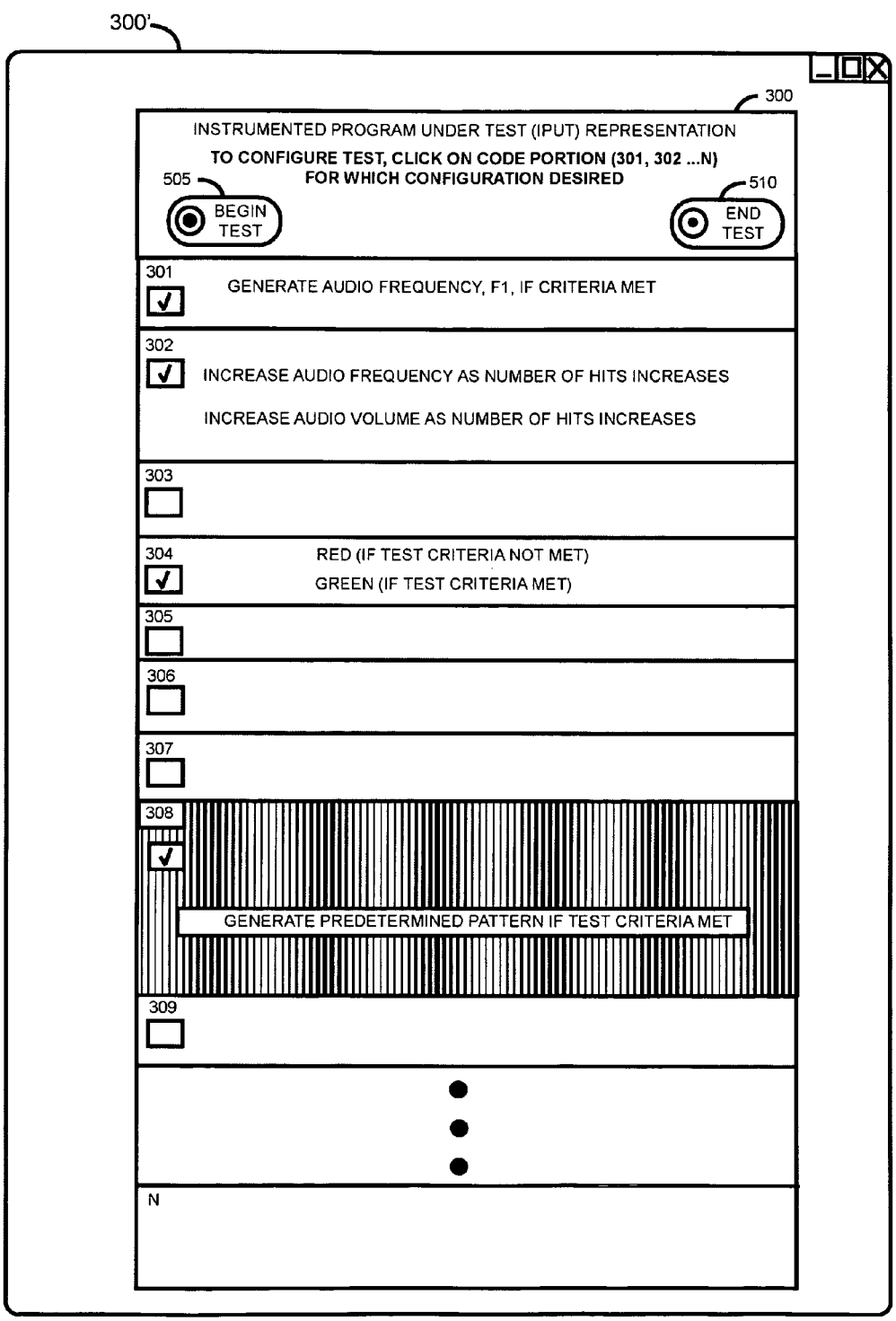
FIG. 3A shows a representation of an instrumented program under test (IPUT).

FIG. 3A shows a window 300' that display 140 may display to depict instrumented program under test (IPUT) 300. In this particular embodiment, IPUT 300 includes code portions or modules 301, 302, 303, . . . N wherein N is the total number of code portions or modules. These code portions may be code portions that exhibit sizes other than modules such as threads, functions, objects and routines, for example. One or more of code portions or modules 301, 302, 303, . . . N may be code portions of interest, namely code portions of IPUT 300 that user 210 desires to monitor for testing according to particular test criteria. To indicate a code portion of IPUT 300 as being a code portion of interest, the user checks the check box appearing immediately below the number of each code portion of interest. In the particular example of FIG. 3A, the user 210 selected the check boxes of modules 301, 302, 304 and 308 to indicate that code coverage analyzer 230 should monitor these modules for the occurrence of particular test criteria that the user may specify. Selecting check boxes in this manner provides test coverage information to code coverage tool 102.

In the manner described above, the user may select a code portion of interest, namely a particular section of IPUT 300 that the user desires the code coverage analyzer module 230 to monitor based on user-supplied test criteria. The test coverage information that user 210 supplies to user input module 205 includes the user's selection of a particular section or sections of IPUT 300 for analysis. The test coverage information may also include analysis criteria or test criteria that the user may supply. For example, if the user selects the function level as the granularity level and a module 304 (FIG. 3A), as the code portion of interest, then the user may select a number of function hits per second within module 304 as the test criteria. In other words, the user may specify that code coverage analyzer module 230 provides output information when, during execution of IPUT 300, the total number of hits of functions within module 304 exceeds a threshold such as 10 hits per second. This 10 hit per second threshold is representative. The user may select other threshold values as well, for example, 5 bits per second, 20 bits per second, and other threshold values depending on the particular application. The manner by which user 210 may specify this additional test coverage information or user-supplied test criteria, as well as type of test output desired, is discussed below in more detail with reference to FIGS. 3B-3F.

Code coverage analyzer module 230 provides the output information to output module (O MOD) 245 as test results. Within the test coverage information that the user provides to user input module 205, the user 210 may specify different sensory output types. For example, user 210 may specify or select an auditory output type or a visual output type. If the user selects auditory or audio output, the output module 245 may generate an output signal that instructs I/O device 150 of FIG. 1 to generate an audio signal exhibiting a predetermined frequency, F1, when the number of hits within module 301 exceeds a predetermined threshold number of hits per second. FIG. 3A depicts this scenario in code portion of interest or module 301 of IPUT 300.

If the user specifies auditory or audio output, the output module 245 may generate an output signal that instructs I/O device 150 of FIG. 1 to generate an audio signal that increases in frequency as the number of hits in module 302 increases. Alternatively, the user may specify that the audio signal decreases in frequency as the number of hit in module 302 increases. The user may also specify that the volume of the audio signal increases as the number of hits in module 302 increases. Alternatively, the user may specify that the volume of the audio signal decreases as the number of hits per second in module 302 increases. The user 210 thus maintains control over the particular audio signal that I/O device 150 generates when the test that code coverage analyzer module 230 finds the user-specified criteria.

Alternatively, the user may specify visual or video output as a response that output module 245 produces once the test meets the user-specified criteria. For example, if the test indicates more than a predetermined number of hits per second within code portion of interest or module 304, then output module 245 may instruct display 140 of FIG. 1 to generate an image showing module 304 as a particular color, for example, green. Otherwise, the color of the image showing module 304 remains green, for example, to indicate that this particular module does not currently meet test criteria. Instead of color, or in addition to color, the user 210 may select or specify a predetermined pattern that module 308 should exhibit if the test indicates more than a predetermined number of hits per second within module 308, as seen in FIG. 3A. Otherwise, module 308 may exhibit a plain appearance or texture such as in module 307 of FIG. 3A.

In one embodiment, window 300' of FIG. 3A displays test results in real time on display 140 while IPUT 300 executes on IHS 100. Input module 205, code coverage analyzer 230, output module 245 and IPUT 300 may execute concurrently to provide real time test results to user 210 via window 300'.

Figure 3B:
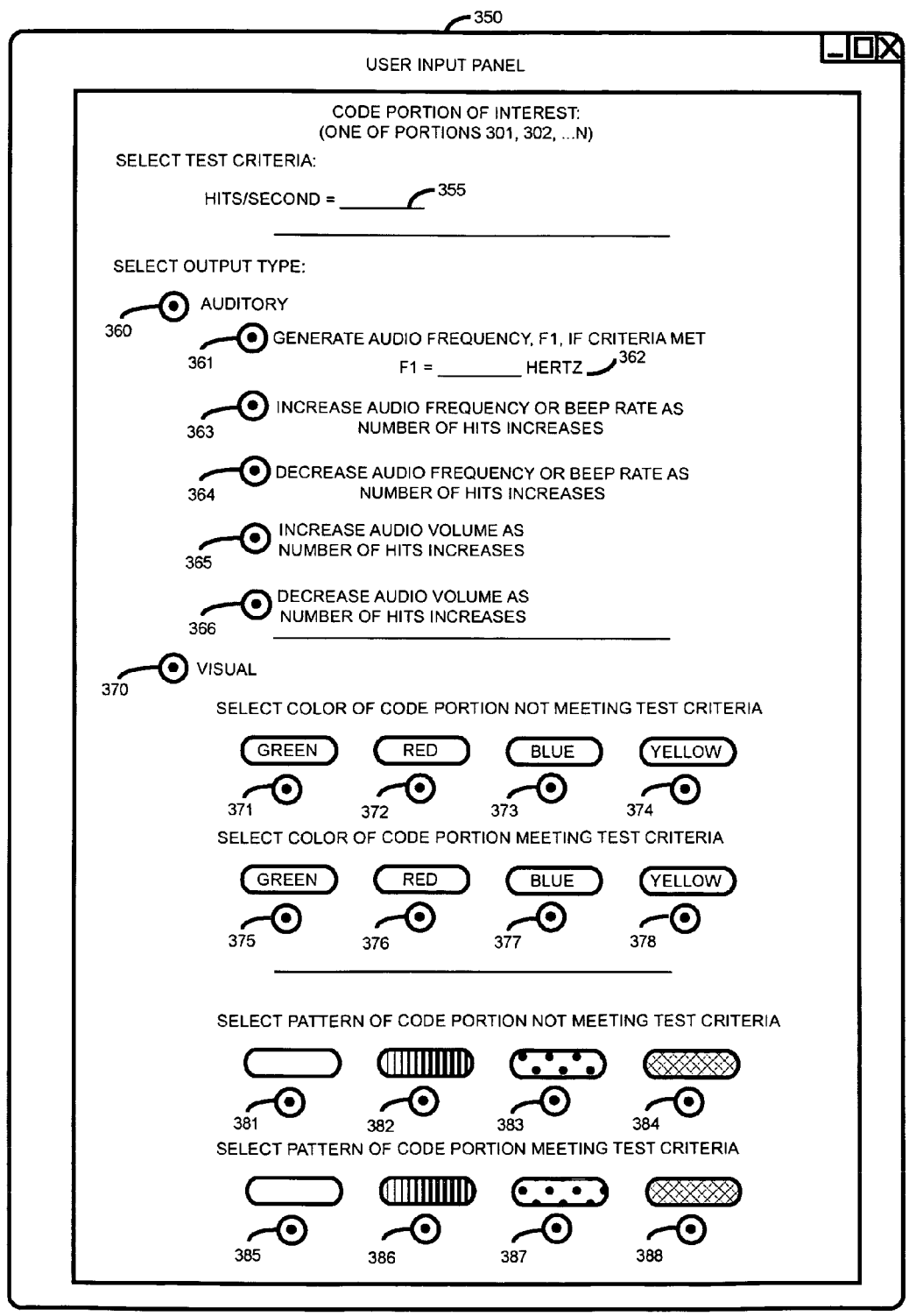

FIG. 3B shows a user input window or panel 350 that user input module 205 displays on display 140 to allow user 210 to provide test information to code coverage tool 102. The user may use user input panel 350 before, during or after testing of IPUT 300. To access user input panel 350, user 210 may click on a representation of one of modules 301, 302, . . . N (or other code portions) of FIG. 3A to select a particular module. When the user clicks on one of modules 301, 302, . . . N of FIG. 3A, output module 245 causes the display of a user input panel 350 corresponding to that respective module, as shown in FIG. 3B. The user may input test criteria such as the number of hits per second within a module at data input line 355. The user may specify sensory output types such as auditory sensory output and visual sensory output. To select an auditory sensory output type, the user selects auditory radio button 360. To select a visual sensory output type, the user selects visual radio button 370.

When the user selects auditory sensory output type radio button 360, the user may also select a generate audio frequency, F1, radio button 361 to instruct output module 245 to generate an output signal corresponding to a frequency, F1. The user may input any value for frequency F1 in F1 input line 362. For example, the user may type a value of 5000 Hz in input line 362. When the user selects auditory sensory output type radio button 360, the user may also select "increase audio frequency or beep rate as number of hits increases" radio button 363. This causes the frequency of the audio signal that device 150 generates to increase as the number of hits in the code portion of interest increases. Alternatively, the user may select "decrease audio frequency or a beep rate as number of hits increases" radio button 364. In that event, the frequency of the audio signal that I/O device 150 generates will decrease as the number of hits in the code portion of interest increases.

When the user selects auditory sensory output type radio button 360, the user may also select "increase audio volume as the number of hits increases" radio button 365. This causes the volume of the audio signal that I/O device 150 generates to increase as the number of hits in the code portion of interest increases. Alternatively, the user may select "decrease audio volume as the number of hits increases" radio button 365. In that event, the volume of the audio signal that I/O device 150 generates will decrease as the number of hits in the code portion of interest increases.

When the user selects visual sensory output type radio button 370, the user may also select one of radio buttons 371, 372, 373 and 374 to designate a color that the code portion of interest or module of FIG. 3A should exhibit in the event of that module not meeting the test criteria. In that event, the user may further select one of radio buttons 375, 376, 377 and 378 to designate a color that the code portion of interest or module of FIG. 3A should exhibit in the event of that module meeting test criteria.

Alternatively, when the user selects visual sensory output type radio button 370, the user may also select one of radio buttons 381, 382, 383 and 384 to designate a pattern that the code portion of interest or module of FIG. 3A should exhibit in the event of that module not currently meeting test criteria. The user may further select one of radio buttons 385, 386, 387 and 388 to designate a pattern that the code portion of interest or module of FIG. 3A should exhibit in the event of that module currently meeting test criteria. A use may check both auditory button 360 and visual button 370 to enable both auditory and visual output simultaneously.

Figure 3C:
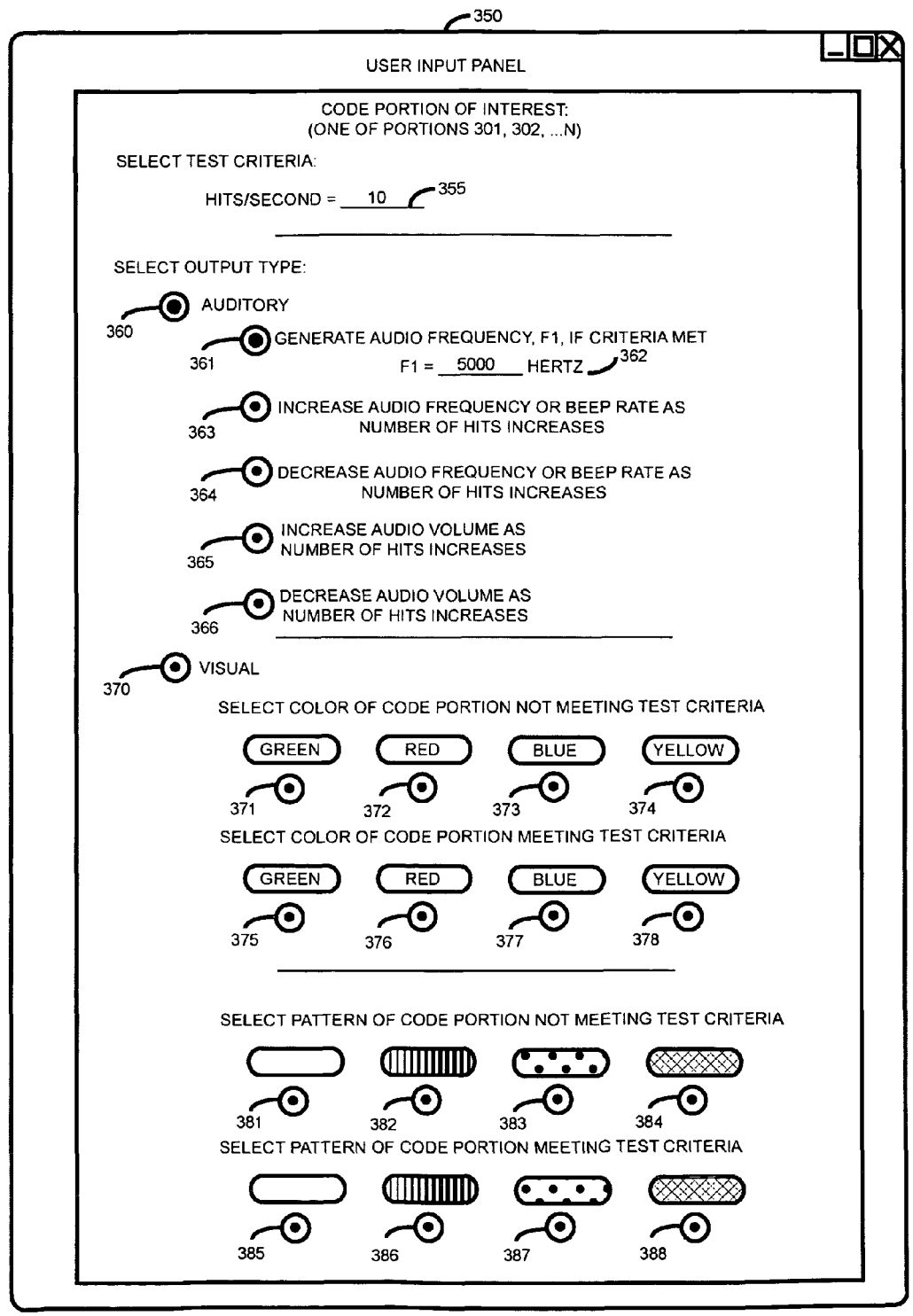

FIG. 3C shows user input panel 350 with the following user selections. The user selected 10 hits per second as the threshold test criteria hit rate for a particular module or code portion of interest. The user indicates this selection by typing 10 into input line 355. The user also selected auditory output type via selection of radio button 360. The user indicates this selection by clicking on the center of radio button 360. Output module 245 enlarges the center of radio button 360 to indicate selection of that radio button. The user further selected 5000 Hz as the frequency that the audio output should generate to indicate attainment of the 10 hits per second hit rate by the particular module or code portion of interest under test.

FIG. 3D shows user input panel 350 with the following user selections. The user selected 50 hits per second as the threshold criteria hit rate for a particular module or code portion of interest. The user indicates this selection by typing 50 into input line 355. The user also selected auditory output type via selection of radio button 360. The user further selected to increase the audio frequency or beep rate of the audio signal that I/O device 150 generates as the number of hits in the particular module or code portion of interesting increases. The user indicates this selection by clicking on radio button 363.

Figure 3E:
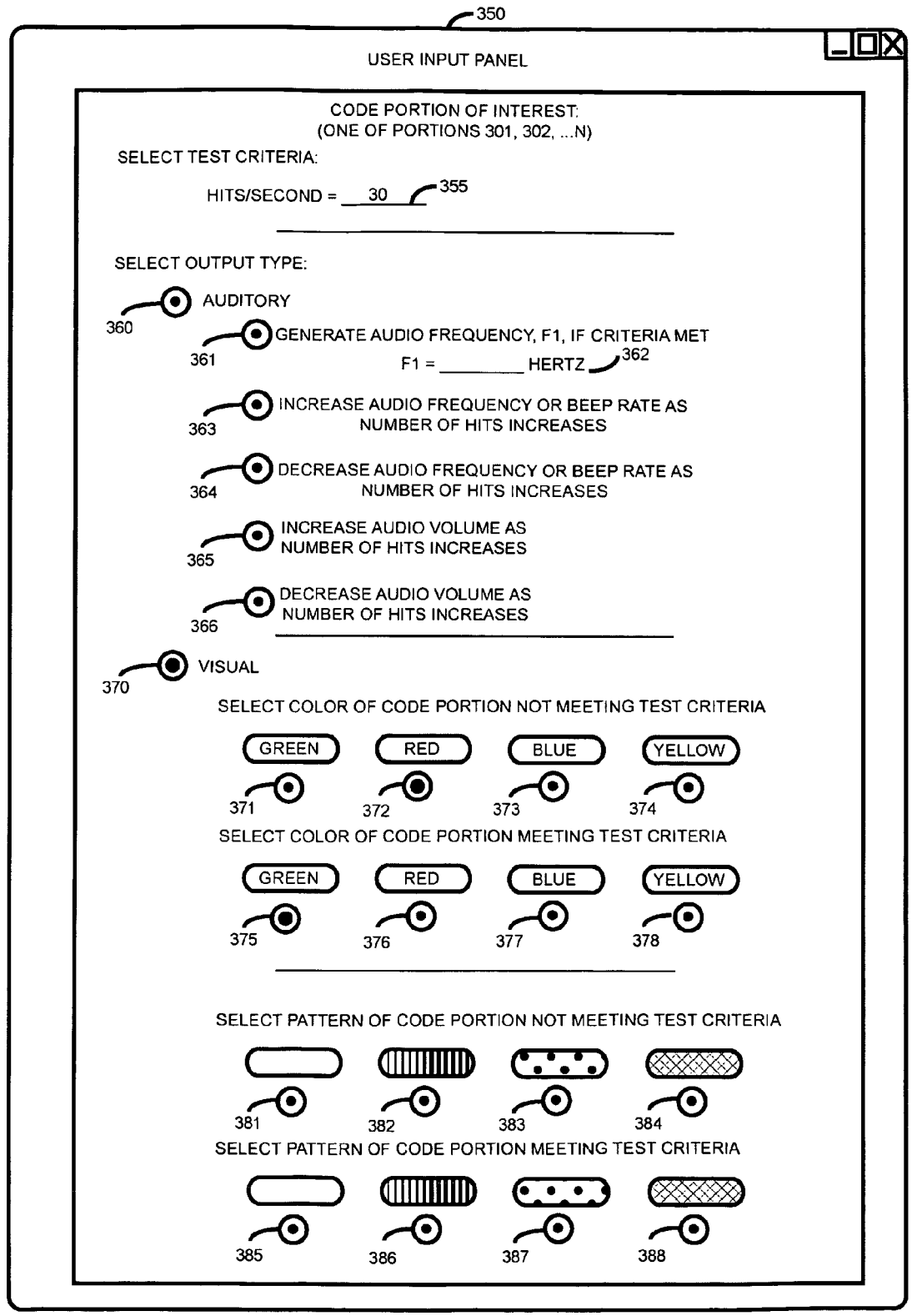

FIG. 3E shows user input panel 350 with the following user selections. The user selected 30 hits per second as the threshold criteria hit rate for a particular module or code portion of interest. The user indicates this selection by typing 30 into input line 355. The user also selected visual output type via selection of radio button 370. The user further selected the color red as the color to paint the particular module or code portion of interest of FIG. 3A that does not currently meet the test criteria. The user indicates this selection by clicking on radio button 372. The user further selected the color green as the color to paint the particular module or code portion of interest of FIG. 3A that currently meets the test criteria. The user indicates this selection by clicking on radio button 375.

FIG. 3F shows user input panel 350 with the following user selections. The user selected 40 hits per second as the threshold criteria hit rate for a particular module or code portion of interest. The user indicates this selection by typing 40 into input line 355. The user also selected visual output type via selection of radio button 370. The user further selected a plain pattern as the pattern to paint the particular module or code portion of interest of FIG. 3A that does not currently meet the test criteria. The user indicates this selection by clicking on radio button 381. The user further selected the vertical bar pattern as the pattern to paint the particular module or code portion of interest of FIG. 3A that currently meets the test criteria. The user indicates this selection by clicking on radio button 386.

FIG. 4 is a flowchart that depicts representative process flow in IHS 100 as it tests selected code portions of interest of a PUT to determine if the code portions of interest meet respective selected test criteria. One embodiment of the testing process or method starts when the user 210 selects a program under test (PUT), as per block 405. The user may select from multiple programs under test (PUT) 221, 222 and 223. In this particular example, the user selects PUT 221 for testing. User input module (UI MOD) 205 receives this PUT selection as test coverage information from user 210 as FIG. 2 indicates. The user selects the granularity level at which code coverage analyzer 230 will conduct testing. For example, this granularity level may be a line, thread, function, object, routine, file or other granularity level. User input module 205 receives the user's selection of the granularity information as test coverage information, as per block 410. User input module 205 instructs instrumentation module (INST MOD) 235 to instrument the selected PUT 221 at the granularity level that the test coverage information specifies, as per block 415. In response, instrumentation module 235 places hooks in PUT 221 at the granularity level that the test coverage information specifies, as per block 420. In this manner, instrumentation module 235 forms the instrumented program under test (IPUT) 300.

Code coverage analyzer module (CCA MOD) 230 receives IPUT 300, as per block 425. User 205 selects the portion or portions of interest of IPUT 300, as per block 430. User 205 may perform this selection by clicking on a checkbox of a particular code portion of interest or module 301, 302, . . . N of IPUT 300 as shown in FIG. 3A. The user inputs selected test criteria for each code portion of interest to user input module 205, as per block 435. The user selects a particular sensory output type that the user desires for each respective code portion of interest, as per block 440. In one embodiment, the user may select an auditory or visual output type in block 440. For example, as seen in FIG. 3C, for a particular portion of interest, the user selects auditory button 360 in block 440. This provides test coverage information to code coverage tool 102. IHS 100 executes IPUT 300 and code coverage analyzer (CCA MOD) 230 to test IPUT 300 according to the user-specified test criteria, as per block 445. Code coverage analyzer module 230 determines the entry points and exit points of each of code portions or modules 301, 302, . . . N, as per block 450. IHS 100 stores these entry and exit points for each module in a summary report or log 109 that nonvolatile storage 145 stores.

Code coverage analyzer module 230 conducts a test to determine if a particular code portion of interest or module meets the user-specified test criteria, as per decision block 455. For example, decision block 455 may determine if the number of hits per unit time of a particular module exceeds a predetermined amount. Code coverage tool 102 provides a real time auditory report, as per block 460, if the user selected an auditory report. For example, if the user selected auditory radio button 360 and increase audio frequency or beep rate button 363 in user input panel 350 of FIG. 3D, then output module 245 will increase the audio frequency of an audio signal that I/O device 150 generates from one frequency, F2, to another frequency, F3, provided the hit rate in the particular module satisfies or exceeds the test criteria. If the hit rate at some point in time no longer satisfies the test criteria, then the audio frequency that I/O device 150 generates returns to the F2 audio frequency. Output module 245 and I/O device 150 cooperate to provide real time test results for the particular module. In other words, during the testing and execution of IPUT 300, for those times when the code portion of interest or module meets or exceeds selected test criteria, code coverage tool 102 provides an auditory indication that the code portion of interest meets or exceeds the selected test criteria. However, for those times when the code portion of interest or module does not meet or exceed the selected test criteria, code coverage tool 102 provides a different auditory indication to portray that the code portion of interest does not meet or exceed the selected test criteria. Thus, this real time auditory indication may frequently change over time while IPUT 300 executes. IHS 100 may keep a log or report 109 of those times a particular code portion of interest meets test criteria as well as those times when the particular code portion of interest does not meet the test criteria.

If the user specifies a visual output instead of an auditory output at visual output type checkbox 370 of FIG. 3E, then code coverage tool 102 provides a real time visual report, as per box 460. For example, if the user checks check box 372 (red) and checkbox 375 (green), then for those times when a module such as module 304 does not meet the test criteria, such as hits per second, then output module 245 instructs I/O device 150 to display red for that module. However, for those times when module 304 does currently meet test criteria, then output module 245 instructs I/O device 245 to display green for that module. This display of the code portion of interest or module 304 in red or green may take the form of window 300' shown FIG. 3A. In window 300', a respective geometric shape represents each code portion of IPUT 300. In this particular example, a rectangle represents each code portion of IPUT 300. However, other geometric shapes such as square, circular and elliptical may also represent each code portion.

Code coverage analyzer module 230 may continuously test to determine if selected code portions of interest or modules meet respective test criteria for those modules until testing completes. Testing may complete in a number of different ways. To commence testing, the user may click and select begin test button 505 of FIG. 3A. To manually end testing, the user may click and select end test button 510. While testing to determine if a particular module or other code portion meets the test criteria in decision block 455, code coverage analyzer module 230 conducts a time out test to determine if the testing time exceeds a predetermined amount of testing time, as per block 465. If the currently transpired testing time does not exceed the predetermined amount of testing time, for example 10 minutes, then testing for the selected criteria continues at decision block 455. In other words, IHS 100 continues testing for the testing criteria and further continues displaying the current real time results of testing as shown in window 300' of FIG. 3A. However, if the transpired testing time exceeds the predetermined amount of testing time, then code coverage tool 102 terminates testing activities and issues a summary report 109, as per block 470. In contrast to the real time report that block 460 provides via window 300', the summary report that block 470 provides is a cumulative summary of testing results for each code portion of interest as of the time that testing terminates.

Figure 5:
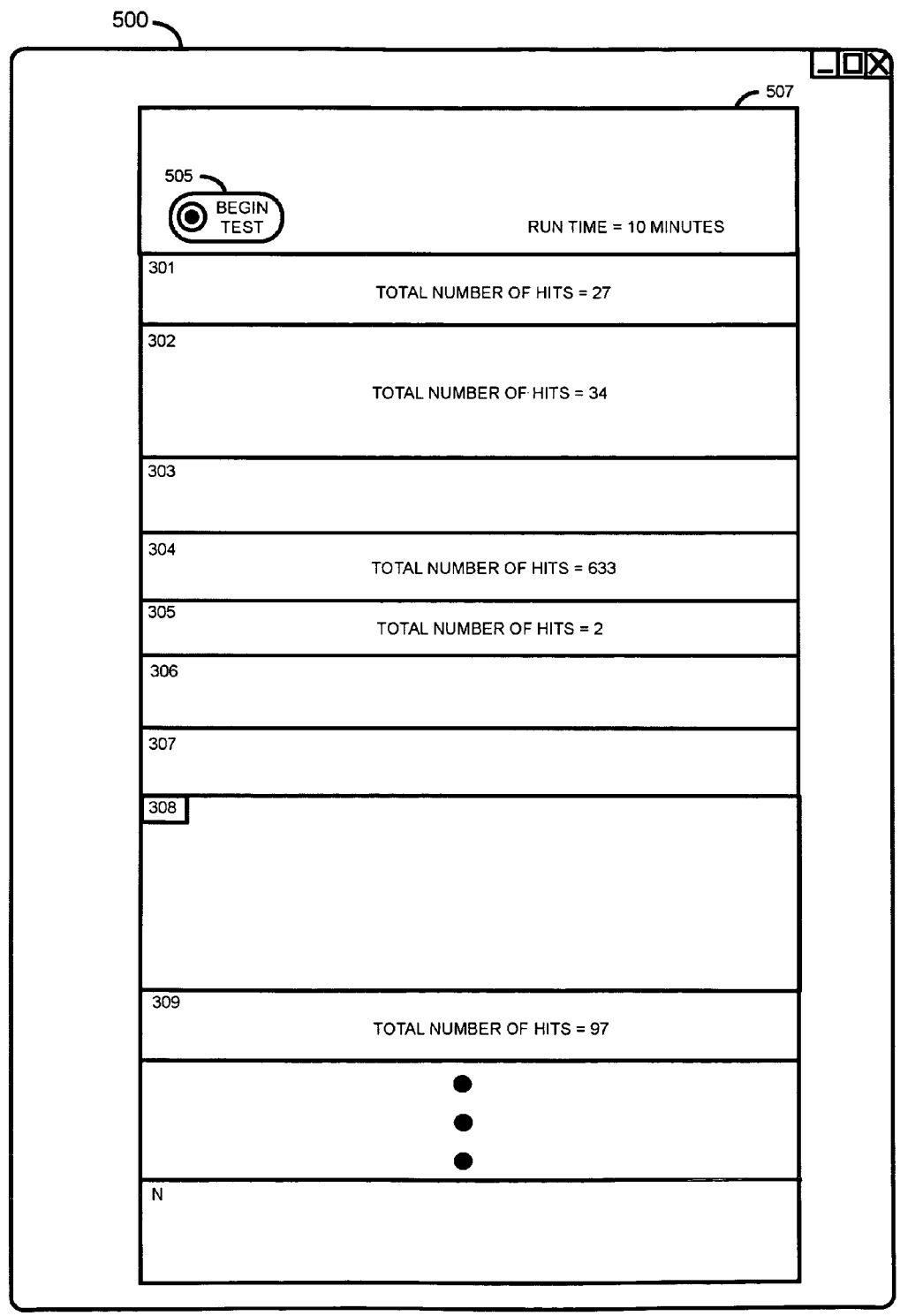
FIG. 5 depicts a representative summary report after the testing process completes.

FIG. 5 shows an example of a report window 500 that includes a report 507 having representations of code portions of interest 301, 302 . . . N therein. In this particular example, code portions 301, 302, 304, 305 and 309 are code portions of interest. Report 507 shows the number of hits for each of code portions 301, 302, 304, 305 and 309 in FIG. 5. For example, code portion of interest 301 exhibits a total of 27 hits and code portion of interest 304 exhibits a total of 633 hits upon completion of testing. Report 507 of FIG. 5 is an example of one type of summary report 109 of FIG. 1.

The user may input test criteria in real time while code coverage analyzer module 230 executes and conducts testing. The user may also input test criteria prior to executing code coverage analyzer module 230 or after code coverage analyzer module 230 completes analysis and provides a report.

Those skilled in the art will appreciate that the various structures disclosed can be implemented in hardware or software. Moreover, the methodology represented by the blocks of the flowchart of FIG. 4 may be embodied in a computer program product, such as a media disk, media drive or other media storage such as computer program product medium 108 of FIG. 1.

In one embodiment, code coverage tool 102 implements the disclosed methodology as a set of instructions (program code) in a code module which may, for example, reside in the system memory 120 of IHS 100 of FIG. 1. Until IHS 100 requires this set of instructions, another memory, for example, non-volatile storage 145 such as a hard disk drive, or a removable memory such as an optical disk or floppy disk, may store this set of instructions. IHS 100 may also download this set of instructions via the Internet or other computer network. Thus, a computer program product may implement the disclosed methodology for use in a computer such as IHS 100. In such a software embodiment, RAM or system memory 120 may store code that carries out the functions described in the flowchart of FIG. 4 while processor 110 executes such code. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of testing, comprising:
receiving, by a code coverage tool, first test coverage information that describes a first test to be conducted on a program under test;
receiving, by the code coverage tool, first user input specifying a granularity level of the program under test, wherein the granularity level defines a code portion size of the program under test;
inserting, by the code coverage tool, hooks in the program under test according to the granularity level to form an instrumented program under test, wherein the instrumented program under test comprises a hook for each code portion of the code portion size defined by the granularity level;
performing code coverage testing, by the code coverage tool, on the instrumented program under test based on the first test coverage information to produce test results;
receiving, by the code coverage tool, second user input specifying test output configuration information and a first plurality of code portions, selected for presentation, of the instrumented program under test; and
presenting the test results of the first plurality of code portions as sensory output, by the code coverage tool, in real time based on the test output configuration information, wherein:
the second user input further specifies a presentation mode, and
the presentation mode comprises an auditory output mode comprising at least one of increasing an audio frequency or beep rate as a number of hits increases, decreasing an audio frequency or beep rate as a number of hits increases, increasing audio volume as a number of hits increases, or decreasing audio volume as a number of hits increases.

2. The method of claim 1, further comprising:
receiving, by the code coverage tool, third user input specifying modified test output configuration information; and
altering, in real time, the presentation of the test results based on the modified test output configuration information.

3. The method of claim 1, wherein the second user input further specifies a test criterion.

4. The method of claim 3, wherein the presentation mode comprises an auditory output mode comprising generating an audio frequency if a given portion of the program under test meets the test criterion.

5. The method of claim 3, wherein the presentation mode comprises a visual output mode comprising at least one of displaying a selected color if a given portion of the program under test does not meet the test criterion, displaying a selected color if a given portion of the program under test meets the test criterion, displaying a selected pattern if a given portion of program under test does not meet the test criterion, or displaying a selected pattern if a given portion of program under test meets the test criterion.

6. An information handling system (IHS), comprising
a processor,
a memory coupled to the processor, the memory being configured with a code coverage tool that:
receives first test coverage information that describes a first test to be conducted on a program under test that the processor executes;
receives, first user input specifying a granularity level of the program under test, wherein the granularity level defines a code portion size of the program under test;
inserts hooks in the program under test according to the granularity level to form an instrumented program under test, wherein the instrumented program under test comprises a hook for each code portion of the code portion size defined by the granularity level;
performs code coverage testing on the instrumented program under test based on the first test coverage information to produce test results;
receives second user input specifying test output configuration information and a first plurality of code portions, selected for presentation, of the instrumented program under test; and
presents the test results of the first plurality of code portions as sensory output in real time based on the test output configuration information, wherein:
the second user input further specifies a presentation mode, and
the presentation mode comprises an auditory output mode comprising at least one of increasing an audio frequency or beep rate as a number of hits increases, decreasing an audio frequency or been rate as a number of hits increases, increasing audio volume as a number of hits increases, or decreasing audio volume as a number of hits increases.

7. The IHS of claim 6, wherein the code coverage tool:
receives third user input specifying modified test output configuration information; and
alters, in real time, the presentation of the test results based on the modified test output configuration information.

8. The IHS of claim 6, wherein the second user input further specifies a test criterion.

9. The IHS of claim 8, wherein the presentation mode comprises an auditory output mode comprising generating an audio frequency if a given portion of the program under test meets the test criterion.

10. The IHS of claim 8, wherein the presentation mode comprises a visual output mode comprising at least one of displaying a selected color if a given portion of the program under test does not meet the test criterion, displaying a selected color if a given portion of the program under test meets the test criterion, displaying a selected pattern if a given portion of program under test does not meet the test criterion, or displaying a selected pattern if a given portion of program under test meets the test criterion.

11. A computer program product stored on a computer operable medium, comprising:
instructions that receive first test coverage information that describes a first test to be conducted on a program under test;
instructions that receive first user input specifying a granularity level of the program under test, wherein the granularity level defines a code portion size of the program under test;
instructions that insert hooks into the program under test according to the granularity level to form an instrumented program under test, wherein the instrumented program under test comprises a hook for each code portion of the code portion size defined by the granularity level;

instructions that perform code coverage testing on the instrumented program under test based on the first test coverage information to produce test results;

instructions that receive second user input specifying test output configuration information and a first plurality of code portions, selected for presentation, of the instrumented program under test; and instructions that present the test results of the first plurality of code portions as sensory output in real time based on the test output configuration information, wherein:

the second user input specifies a presentation mode and a test criterion, and the presentation mode comprises an auditory output mode comprising at least one of generating an audio frequency if a given portion of the program under test meets the test criterion, increasing an audio frequency or beep rate as a number of hits increases, decreasing an audio frequency or beep rate as a number of hits increases, increasing audio volume as a number of hits increases, or decreasing audio volume as a number of hits increases.

12. The computer program product of claim 11, wherein the presentation mode comprises a visual output mode comprising at least one of displaying a selected color if a given portion of the program under test does not meet the test criterion, displaying a selected color if a given portion of the program under test meets the test criterion, displaying a selected pattern if a given portion of program under test does not meet the test criterion, or displaying a selected pattern if a given portion of program under test meets the test criterion.

13. The computer program product of claim 11, wherein the presentation mode comprises an auditory output mode comprising generating an audio frequency if a given portion of the program under test meets the test criterion.

14. The computer program product of claim 11, further comprising:

instructions that receive third user input specifying modified test output configuration information; and instructions that alter, in real time, the presentation of the test results based on the modified test output configuration information.

* * * * *